United States Patent Office 3,847,839
Patented Nov. 12, 1974

3,847,839
ALKOXYLATED FURFURYL ALCOHOL STRIPPING COMPOSITION AND METHOD
Donald P. Murphy, Madison Heights, and Henry Valatka, Detroit, Mich., assignors to Oxy Metal Finishing Corporation, Warren, Mich.
No Drawing. Filed Jan. 17, 1973, Ser. No. 324,281
Int. Cl. C11d 7/06, 7/32
U.S. Cl. 252—544                          12 Claims

ABSTRACT OF THE DISCLOSURE

Disclosed is a method and composition useful for stripping an organic coating from the surface to which it is adhered. The stripping composition is phenol-free and contains an alkoxylated furfuryl alcohol and an inorganic alkaline material.

BACKGROUND OF THE INVENTION

This invention relates to a composition and method for removing protective organic coatings from surfaces and more particularly it relates to a novel additive for increasing the effectiveness of alkaline stripping compositions.

In the manufacture of various commercial articles, it is often the practice to provide such articles with a protective and/or decorative organic coating on the surface. The coatings applied include paints, varnishes, lacquers and the like, and are formulated from numerous and diverse components, including acrylic resins, epoxy resins, vinyl resins, alkyd resins, and the like.

In the course of manufacturing these commercial articles, it sometimes happens that some of the articles fail to meet the manufacturing specification because of some defect in the protective and/or decorative coatings which are applied. When this happens, it is desirable to remove the defective coating, eg., paint, from the article so that it may be recoated rather than discarded or sold as a "second," with the resulting financial loss. In recent years, however, great improvements have been made in both the durability and adhesion of paints and similar protective coatings so that their removal from a surface after they have been applied, cured and/or dried, has become increasingly difficult. These difficulties have been encountered particularly when using chemical means to effect the removal of the coatings, such chemical removal methods generally being preferred because they tend to limit costly hand operations and are more readily adapted to a continuous process.

Not only is it desirable to remove the paint on articles from which the coating is defective, but, additionally, where the articles being coated are transported on a conveyor line, the hooks which support the article also become coated with the paint or similar coating during the process. Since these hooks or hangers are repeatedly introduced into the painting zone of the process, the paint continues to build up on them adding weight to the conveyor line and often filling in the hook if it is not periodically stripped off or removed. Accordingly, it is desirable to remove such protective coatings from these hooks or hangers as well as from defective articles, quickly and completely, and preferably by using chemical means.

In the past, considerable use has been made of alkaline stripping compositions in which the article from which the protective coating is to be removed is immersed for a period of time sufficient to effect a substantial loosening of the coating. With the advent of improved paint systems, such as the acrylic paints and lacquers, difficulties have often been encountered with such alkaline stripping compositions. Frequently, it has been found that the articles must be immersed in a boiling alkaline stripping composition for several hours in order to obtain the desired loosening of the protective coating. In some instances, even longer contact times have not resulted in an appreciable loosening of the coating.

U.S. Pat. 3,615,827 suggests an alkaline stripping composition containing a polyalkylene glycol and ethylene glycol monophenyl ether, a phenol derivative. Since phenol compounds have come under the increasing scrutiny of environmental interests and administrators of the Occupational Safety and Health Act, it would be desirable to eliminate their use. U.S. Pat. 3,308,066 suggests an alkaline composition containing tripropylene glycol as the sole accelerating ingredient; however, the stripping time is not as short as would be desired.

SUMMARY OF THE INVENTION

It is an object of the present invention to provide an improved composition and method for removing protective and/or decorative organic coatings from surfaces to which they have been applied.

It is another object of this invention to provide a stripping composition which does not depend upon environmentally objectionable phenol derivatives for its efficacy.

Broadly, the invention includes an accelerator which comprises an alkoxylated furfuryl alcohol as the essential organic component of the invention, a concentrate composition which comprises the accelerator with or without a minor portion of water, and an aqueous working composition comprising the concentrate composition diluted with water to the desired working concentration.

Accordingly, the present invention includes a concentrate composition useful for removing organic coatings which comprises one or more inorganic alkaline materials and an accelerator. The accelerator contains an alkoxylated furfuryl alcohol and preferably also contains an activator which acts together with the alkoxylated furfuryl alcohol to further reduce the stripping time. Such compositions, when dispersed in water, are found to give excellent results in removing or substantially loosening decorative and/or protective films, such as paints and the like, from metal surfaces to which they have been applied. These compositions are particularly effective in removing coating materials containing acrylic, epoxy, vinyl, or alkyd resin coating components, which coating materials have heretofore been removed, if at all, only with great difficulty when using conventional alkaline paint strippers. In the following description, all percentages are by weight unless otherwise specified.

DETAILED DESCRIPTION OF THE INVENTION

In formulating the aqueous alkaline paint stripping compositions of the present invention, the concentrate compositions, described above, may be dissolved in water in amounts sufficient to provide the desired alkalinity to effect substantial loosensing the paint film to which the composition is applied, but preferably in amounts not exceeding the maximum solubility of the accelerator composition in the solution. In this regard, it has been found that the solubility of the accelerator composition is inversely proportional to the alkalinity of the stripping solution, so that at lower alkalinities, more of the accelerator composition can be dissolved in the stripping solution. Typically, the aqueous alkaline paint-stripping solutions of the present invention will contain the concentrate composition in amounts within the range of about 0.5 pounds to about 5 pounds per gallon of solution, with amounts within the range of about 1 pound to about 3 pounds per gallon being preferred. Where the accelerator has not been combined with the alkaline material, they may be separately added to form the stripping solution in amounts as have been indicated hereinabove. In its most preferred embodiment, the aqueous alkaline paint stripping solution contains the alkaline material in an amount of about 1 to 2 pounds per gallon and the accelerator composition in an amount of up to 10 percent by volume of the stripping solution.

In utilizing the stripping compositions of the present invention, the aqueous alkaline stripping solution, formulated as has been indicated hereinabove, is brought into contact with the article from which it is desired to remove paint or a similar protective or decorative coating. The contact time needed to effect a substantial loosening of the paint from the surface will depend on the nature and thickness of the paint which is to be removed. With some paint, contact times of a few minutes, e.g., 2 to 3 minutes, may be sufficient while with other and more difficult-to-remove paints, appreciably longer contact times, e.g., 30 minutes or more, may be desirable. Accordingly, it is not feasible to give specific contact times because the times of contact used will, in each instance, be those which will effect a substantial loosening of the paint on the surface.

In this regard it is to be noted that it is not essential that the stripping composition of the present invention remain in contact with the coated surface for a period of time sufficient to effect complete removal of the coating from the surface. It is only necessary that the contact time be sufficient to effect a loosening of the paint film on the surface so that it may be removed by brushing, high-pressure water sprays, or the like. Generally, it is desirable that the contact between the stripping composition and the surface from which the coating is to be removed is effected by immersing the surface in the stripping solution. In this manner, a thorough and continuous wetting of the surface film by the stripping solution is obtained, with little or not loss of the stripping solution. In some remove films are to be treated which normally require only short contact times, other contacting techniques such as spraying, flooding, or the like, may be utilized.

Normally, the paint-stripping solution is at an elevated temperature of at least 120° F. when it is brought into contact with the surfaces from which the protective film is to be removed. Preferably, the solution is at a temperature which is close to its boiling point with temperatures within the range of about 90° to about 100° C. being typical. It will be appreciated, however, that in some instances either higher or lower temperatures, e.g., room temperature may also be used.

After the protective film on the surfaces treated has been substantially loosened by contact with the stripping solution, and the film has been removed from the surface, either by retaining the surface in the stripping solution until removal is complete or by utilizing other techniques on the loosely adhering film, the surface is in condition to be recoated with a new protective film. Generally, it is preferred that the surface be water-rinsed so as to remove any of the alkaline stripping subjecting the surface to the coating operation. It has been found that by using the aqueous alkaline stripping solutions described above, in the manner which has been indicated greatly improved results are obtained in terms of reduction in the time required to effect a substantial loosening of many different types of protective film, such as paints, lacquers, varnishes, and the like.

The accelerator of this invention comprises an alkoxylated furfuryl alcohol as an essential ingredient. Suitable compounds have the formula:

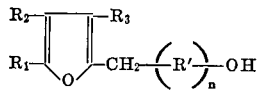

$R_1$, $R_2$ and $R_3$ may be H, halogen, or any alkyl group having not more than 6 carbon atoms. $R'$ may be any alkoxy group having not more than 4 carbon atoms and $n$ may be any integer not exceeding 2. Examples of suitable compounds are monoethoxylated furfuryl alcohol and diethoxylated furfuryl alcohol.

The accelerator makes up from 3–50% of the concentrate composition (.15–20% of the aqueous working solution). The concentrate composition also comprises from 50–97% alkaline material. A major portion of the alkaline material is an alkali metal hydroxide. More specifically, the alkaline material of the present invention contains an alkali metal hydroxide, as the principal source of alkalinity in an amount of at least about 50 percent by weight of the alkaline material. Desirably, the alkali metal hydroxide is present in an amount within the range of about 70 percent to about 97 percent by weight of the composition.

The aqueous working solution contains components equivalent to a 0.5 to 5 lb./gal. solution of the concentrate in water and preferably 1.0 to 3 lb./gal.

The accelerator preferably includes an activating component which acts synergistically with the alkoxylated furfuryl alcohol to reduce the stripping time to less than that of either component alone. Where the accelerator contains monoethoxylated furfuryl alcohol, certain glycol and organic nitrogen compounds have been found to be effective activators. Suitable glycols include those having up to 4 ethoxy or 3 propoxy groups such as ethylene glycol, diethylene glycol, triethylene glycol, tetraethylene glycol, propylene glycol, dipropylene glycol and tripropylene glycol. Suitable organic nitrogen compounds are phenyl ethanolamine, melamine, N-aminoethyl piperazine, 2-phenyl imidazole and diisopropanolamine. Other organic nitrogen compounds which were tested as activators with monoethoxylated furfuryl alcohol and found non-synergistic were phenyl diethanol amine, diglycolamine, 2-phenylene diamine, aniline, piperidine, m-chlorophenyl diethanolamine, 2-ethyl imidazole, 2-isopropyl imidazoline, isopropanolamine, triisopropanolamine, ethanolamine, diethanolamine, morpholine, N-aminoethyl ethanolamine, 1,4 cyclohexyl bis (methylamine), methylimino bis (propylamine), hydroxyethyl carbamate, and iminobis (propylamine).

Where the accelerator contains diethoxylated furfuryl alcohol, the only above glycol found effective as an activator was tripropylene glycol. Effective organic nitrogen compounds were piperidine, 2-phenyl imidazole, diethanol amine, diisopropanol amine and triisopropanol amine. The other above-mentioned organic nitrogen compounds were ineffective.

Where the activator is included, it is advantageously present in an amount such that the mole ratio of the furfuryl alcohol to the activator is between about 0.5 and 5.0 to 1. More advantageously, the ratio is between about 1.0 and 3.0 to 1.

In addition to the alkali metal hydroxide, the alkaline materials which are dispersible in water to form the present paint stripping solution may also contain other alkaline components if desired. Such alkaline compositions may include the alkali metal carbonates, alkali metal silicates, alkali metal phosphates, and the like. Exemplary of the alkali metal phosphates which may be used in the composition are trisodium phosphate, tetrasodium pyrophosphate, tetrapotassium pyrophosphate, sodium tripolyphosphate, and the like. Typically, these latter alkaline material, i.e., the alkali metal silicates, carbonates and phosphates, will be present in the concentrated composition, when used, in amounts up to about 50 percent by weight of the composition with amounts within the range of about 3 percent to about 30 percent by weight of the composition being preferred. It is to be understood that the foregoing amounts refer to the total of all alkaline material other than the alkali metal hydroxides, which totals may be made up of only one of the added alkaline materials or of a mixture of two or more of these materials.

The following examples demonstrate the stripping ability of the working solution of the present invention. In each case, steel test panels were first treated with a phosphating solution to form an iron phosphate coating. Thereafter, the panels were painted with Duracron 200 brand acrylic-based paint supplied by PPG Industries. Acrylic paints are among the most resistant to stripping. The paint thickness was uniform at about 1.1–1.5 mils for all panels. The panels were subsequently subjected to the stripping solution at a temperature between 90–100° C. and the time for complete stripping was recorded.

EXAMPLE 1

Solutions of sodium hydroxide as 1½ lb./gal. were prepared and 5 vol. percent of the indicated non-phenolic accelerators gave the following results:

Accelerator: Stripping time—minutes
- Phenethyl alcohol _____ 17.38
- Monoethoxylated furfuryl alcohol _____ 8.81
- Diethoxylated furfuryl alcohol _____ 9.50
- Monoethoxylated anisyl alcohol _____ 26.75
- Diethoxylated anisyl alcohol _____ 21.50
- Monoethoxylated cinnamyl alcohol _____ $NE_{30}$
- Diethoxylated cinnamyl alcohol _____ $NE_{30}$ $NE_{30}$—No effect in 30 minutes.

EXAMPLE 2

The monoethoxylated and diethoxylated furfuryl alcohols were combined with various glycols as activators in a further attempt to reduce the stripping times. The furfuryl alcohol and activator were combined in the mole ratio indicated and added to the caustic solution as in Example 1 to yield a working solution containing 5 vol. percent accelerator. The following combinations showed synergism:

| Activator | Individual stripping time, minutes | Activator plus furfuryl alcohol | Mole ratio furfuryl alcohol/ activator | Combination stripping time, minutes |
|---|---|---|---|---|
| Ethylene glycol | $NE_{60}$ | *1 | 2/1 | 7.00 |
| Diethylene glycol | $NE_{60}$ | 1 | 1/1 | 8.13 |
| Triethylene glycol | $NE_{60}$ | 1 | 2/1 | 7.17 |
| Tetraethylene glycol | $NE_{60}$ | 1 | 3/1 | 7.69 |
| Propylene glycol | $NE_{60}$ | 1 | 2/1 | 8.42 |
| Dipropylene glycol | $NE_{60}$ | 1 | 1/1 | 8.17 |
| Do | $NE_{60}$ | 1 | 2/1 | 8.00 |
| Tripropylene glycol | 15.40 | 1 | 2/1 | 6.17 |
| Do | 15.40 | *2 | 2/1 | 8.08 |

*1 Monoethoxylated compound.
*2 Diethoxylated compound.

NOTE.—$NE_{60}$=No effect at 60 minutes.

EXAMPLE 3

The monoethoxylated furfuryl alcohol was combined with organic nitrogen compounds as in Example 2 and the following were effective activators:

| Activator | Individual stripping time, minutes | Mole ratio furfuryl alcohol/ activator | Combination stripping time, minutes |
|---|---|---|---|
| Phenyl ethanolamine | 8.17 | 1/1 | 7.31 |
| Do | 8.17 | 2/1 | 6.00 |
| Melamine | $NE_{30}$ | 3/1 | 8.75 |
| N-aminoethyl piperazine | $NE_{30}$ | 2/1 | 8.37 |
| 2-phenyl imidazole | 12.42 | 1/1 | 6.94 |
| Do | 12.42 | 2/1 | 7.00 |
| Diisopropanol amine | $NE_{30}$ | 2/1 | 8.67 |

EXAMPLE 4

Further panels were prepared in accordance with foregoing procedure. A 5 vol. percent solution of diethoxylated furfuryl alcohol in 1½ lb./gal. aqueous sodium hydroxide stripped the paint in 11.50 minutes. The following organic nitrogen compounds were effective activators when used in the mole ratios indicated:

| Activator | Individual stripping time, minutes | Mole ratio furfuryl alcohol/ activator | Combination stripping time, minutes |
|---|---|---|---|
| Piperidine | $NE_{30}$ | 1/1 | 10.08 |
| M-chlorophenyl diethanolamine | 6.33 | 2/1 | 6.08 |
| 2-phenyl imidazole | 12.42 | 2/1 | 11.17 |
| Diethanolamine | $NE_{30}$ | 2/1 | 9.00 |
| Triisopropanolamine | 20.00 | 3/1 | 10.75 |
| Diisopropanolamine | $NE_{30}$ | 1/1 | 10.00 |

It is to be appreciated, of course, that as used in the specification and claims, the term "alkali metal" is intended to refer to lithium, sodium, potassium, cesium, and rubidium. In many instances, the preferred alkali metal has been found to be sodium so that primary reference hereinafter will be made to the compounds of sodium. This is not, however, to be taken as a limitation of the present invention but merely as being exemplary thereof.

In addition to the alkaline materials indicated hereinabove, the concentrate compositions of the present invention may also include a gluconic acid material. Such material is typically present in the composition in an amount up to about 10 percent by weight of the composition with amounts within the range of about 2 percent to about 7 percent by weight of the composition being preferred. It is to be understood that by the term "gluconic acid material" it is intended to refer to and include gluconic acid itself, water-soluble and/or water-dispersible forms of gluconic acid such as the alkali metal gluconates and in particular sodium gluconate, gloconodelta-lactone, and the like.

Surface active or wetting agents may also be included in the concentrate composition, typically in amounts up to about 10 percent by weight of the composition with amounts within the range of about 1.0 percent to about 7 percent by weight of the composition being preferred. Various suitable surface-active agents of the anionic, nonionic and cationic types may be used, provided they are soluble and effective in solutions having a high alkalinity. In many instances, excellent results have been obtained when using wetting or surface-active agents of the phosphate ester type and, accordingly, these materials are preferred. Materials of this type are exemplified by QS–44, a product of the Rohm and Haas Company. Additionally, sulfated fatty acid derivatives and sulfonated fatty acid amide derivatives as described in U.S. Pat. Nos. 2,773,068 and 2,528,378, may be used. Exemplary of these materials are Mironol JEM and Miranol $C_2M$ products of the Mironal Chemical Company.

What we claim is:
1. A concentrate composition useful in paint stripping, consisting essentially of about 3–50 wt. percent of an accelerator consisting essentially of an alkoxylated furfuryl alcohol having the formula:

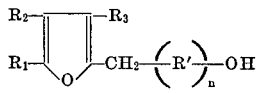

wherein $R_1$, $R_2$ and $R_3$ are independently selected from the group consisting of H, halogen and alkyl groups having not more than 6 carbon atoms; $n$ is an integer not exceeding 2; and $R'$ is an alkoxy group having not more than 4 carbon atoms and about 50–97 wt. percent of an inorganic alkaline material containing a major portion of an alkali metal hydroxide.

2. The concentrate of Claim 1, wherein each of $R_1$, $R_2$ and $R_3$ is H and $R'$ is ethoxy.

3. The concentrate of claim 2, additionally containing an activating glycol selected from the group consisting of those having up to 4 ethoxy or 3 propoxy groups or organic nitrogen compound selected from the group consisting of phenyl ethanolamine, melamine, N-aminoethyl piperazine, 2-phenyl imidazole, piperidine, diethanol amine, diisopropanol amine and triisopropanol amine in an amount such that the mol ratio of furfuryl alcohol to activator is between 0.5 and 5.0 to 1.

4. The concentrate of claim 3, wherein $n$ is 1 and the activator is at least one glycol selected from the group consisting of the ethylene glycols having up to 4 ethoxy groups and the propylene glycols having up to 3 propoxy groups.

5. The concentrate of claim 3, wherein $n$ is 1 and the activator is at least one organic nitrogen compound selected from the group consisting of phenyl ethanolamine, melamine, N-aminoethyl piperazine, 2-phenyl imidazole and diisopropanolamine.

6. The concentrate of claim 3, wherein the activator is tripropylene glycol.

7. The concentrate of claim 3, wherein $n$ is 2 and the activator is at least one organic nitrogen compound selected from the group consisting of piperidine, m-chlorophenyl diethanolamine, 2-phenylimadazole, diethanolamine, diisopropanolamine, and triisopropanolamine.

8. A diluted composition consisting essentially of the concentrate of claim 1 in a concentration between about 0.5 and 5.0 lb./gal. in water.

9. The composition of claim 3 wherein the concentrate is present in a concentration between about 0.5 and 5.0 lb./gal. in water.

10. An aqueous composition consisting essentially of about 0.15 to 20 wt. percent of the accelerator of claim 1 and an inorganic alkaline material in an amount between about 1 and 2 lb./gal. in water.

11. A method of removing an organic coating from the surface of an article, comprising contacting said surface with the composition of claim 8 for a period of time sufficient to effect a substantial loosening of the coating.

12. The method of claim 11, wherein said composition is maintained at a temperature between about 120° F., and its boiling point during the contact period.

References Cited
UNITED STATES PATENTS

| | | | |
|---|---|---|---|
| 2,637,670 | 5/1953 | Brown et al. | 252—158 |
| 3,551,340 | 12/1970 | Skinner | 252—158 |
| 2,975,140 | 3/1961 | Yaroch | 252—156 |

OTHER REFERENCES

Lou P. Johnson, O. G. Defensive Publication of Ser. No. 192,311, published in U.S. (905 O.G. 453) on Dec. 19, 1972, Defensive Publication No. T 905,006 252/158.

RALPH S. KENDALL, Primary Examiner

J. D. WARE, Assistant Examiner

U.S. Cl. X.R.

252—156, 173

UNITED STATES PATENT OFFICE
CERTIFICATE OF CORRECTION

Patent No. 3,847,839                    Dated November 12, 1974

Inventor(s) Donald P. Murphy and Henry Valatka

It is certified that error appears in the above-identified patent and that said Letters Patent are hereby corrected as shown below:

Column 7, line 5, after "between" insert --about--;

Column 7, line 21, "2-phenylimadazole" should be --2-phenylimidazole--.

Signed and sealed this 21st day of January 1975.

(SEAL)
Attest;

McCOY M. GIBSON JR.
Attesting Officer

C. MARSHALL DANN
Commissioner of Patents